US011043082B2

(12) United States Patent
Mariscal et al.

(10) Patent No.: US 11,043,082 B2
(45) Date of Patent: Jun. 22, 2021

(54) WAGERING GAME HAVING IMPROVED PERSISTENT GAME MODE FEATURE

(71) Applicant: Everi Games, Inc., Austin, TX (US)

(72) Inventors: Juan Mariscal, Chicago, IL (US); Robert Spidale, Chicago, IL (US)

(73) Assignee: Everi Games, Inc., Austin, TX (US)

( * ) Notice: Subject to any disclaimer, the term of this patent is extended or adjusted under 35 U.S.C. 154(b) by 0 days.

(21) Appl. No.: 16/518,063

(22) Filed: Jul. 22, 2019

(65) Prior Publication Data

US 2019/0340890 A1 Nov. 7, 2019

Related U.S. Application Data

(63) Continuation of application No. 15/272,219, filed on Sep. 21, 2016, now Pat. No. 10,373,445.

(51) Int. Cl.

*G06F 17/00* (2019.01)
*G07F 17/34* (2006.01)
*G07F 17/32* (2006.01)

(52) U.S. Cl.

CPC .......... *G07F 17/34* (2013.01); *G07F 17/3209* (2013.01); *G07F 17/3213* (2013.01); *G07F 17/3225* (2013.01); *G07F 17/3244* (2013.01); *G07F 17/3267* (2013.01)

(58) Field of Classification Search

CPC .. G07F 17/34; G07F 17/3225; G07F 17/3244; G07F 17/3209; G07F 17/3213; G07F 17/3267

See application file for complete search history.

(56) References Cited

U.S. PATENT DOCUMENTS 5,833,537 A 11/1998 Barrie
6,159,098 A * 12/2000 Slomiany ............ G07F 17/3244 463/25
6,857,958 B2 2/2005 Osawa
9,412,239 B2 8/2016 Gugler
2006/0252546 A1 11/2006 Castellari
2012/0015707 A1 1/2012 Homik
2013/0005426 A1 1/2013 Nicely
2014/0087829 A1* 3/2014 Watkins .................. G07F 17/32 463/20
2015/0248807 A1* 9/2015 Berman .............. G07F 17/3276 463/11
2015/0363998 A1* 12/2015 Comeau .................. G07F 17/34 463/20
2016/0104345 A1 4/2016 MacGregor
2017/0124799 A1 5/2017 Berman
2017/0236374 A1 8/2017 Berman
2018/0225930 A1 8/2018 Efremescu

* cited by examiner

*Primary Examiner* — Dmitry Suhol
*Assistant Examiner* — Carl V Larsen
(74) *Attorney, Agent, or Firm* — The Culbertson Group, P.C.; Nathan H. Calvert

(57) ABSTRACT

A gaming system, apparatus, and method are disclosed providing a wagering games, gaming machines, networked gaming systems that provide a persistent gaming mode including a persistent game mode with multiple rounds in which each round includes a randomization of the matrix of symbol locations, a chance to win an award, and a chance to include a persistent feature event. An adjustable meter may be used to allow players to compete for the same bonuses or jackpots no matter what their bet level. A rolling meter shows special features scheduled to appear in future rounds using a rolling group of status indicators.

19 Claims, 8 Drawing Sheets

*Fig. 1B*
1000
1508
1509
WILD
SHINE
CREDIT
7000
TOTAL WIN
12250
WIN
750
BET
200
SUPER

Copyright 2016, Everi Games, Inc.

WAGERING GAME HAVING IMPROVED PERSISTENT GAME MODE FEATURE

CROSS-REFERENCE TO RELATED APPLICATION

This application is a continuation of U.S. patent application Ser. No. 15/272,219, filed Sep. 21, 2016 and entitled "Wagering Game Having Improved Persistent Game Mode Feature." The entire content of the parent application is incorporated herein by this reference.

FIELD OF THE INVENTION

This invention relates to gaming systems and to gaming machines through which players may participate in wagering games, and in particular slot machine games with a bonus round that provides further game play or special features based on accumulating persistent events.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all rights of copyright whatsoever.

BACKGROUND

Many different types of gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels, and may also provide secondary/bonus games using different reel arrangements or entirely different graphics. Many video-based gaming machines have three or five spinning reels that may be stopped to display a matrix of game symbols. The symbols displayed on the stopped reels correlate to a result of the game. Video-based gaming machines may also be used to show card games or various types of competitions such as simulated horse races in which wagers may be placed.

Game manufacturers are continuously pressed to develop new game presentations, formats, and game graphics in an attempt to provide high entertainment value for players and thereby attract and keep players. One such improvement is the use of persistent features that affect game results across multiple rounds. What is needed are ways to provide both anticipation and excitement to players in using such features.

SUMMARY OF THE INVENTION

The present invention includes wagering games, gaming machines, networked gaming systems that provide a persistent gaming mode including a persistent game mode with multiple rounds in which each round includes a randomization of the matrix of symbol locations, a chance to win an award, and a chance to include a persistent feature event. An adjustable meter may be used to allow players to compete for the same bonuses or jackpots no matter what their bet level. A rolling meter shows special features scheduled to appear in future rounds using a rolling group of status indicators. A persistent game mode control process sets the frequency of scheduled special features and adjusts reel weights to achieve a desired payout.

According to some versions of the invention, a method is given for providing a wagering game, the method conducted by controlling a gaming display with one or more electronic processors, the gaming display including a first display area comprising a matrix of symbol locations. The method includes receiving a player game activation and, in response, providing an animated display in the first display area showing motion in the symbol locations which stops to provide a game outcome. It then determines if the outcome includes a persistent feature activation, and, in response, begins a persistent game mode including multiple rounds in which each round includes a randomization of the matrix of symbol locations, a chance to win an award, and a chance to include a persistent feature event. In a second display area, an adjustable meter of a persistent game feature is displayed, the meter showing a number of persistent feature events required to win first and second bonus awards, the meter adjusted based on a player wager level to reduce the number of events required to win the first and second bonus awards if the wager level is raised, and increase the number of persistent feature events required to win the first and second awards if the wager level is lowered, the meter displaying progress toward the first and second bonus awards. In a third display area, a second rolling meter is displayed showing a rolling subset of persistent game round status indicators, and visually indicating on at least one status indicator a game feature scheduled to be present in at least one potential outcome. The method provides a number of rounds of the persistent game mode and adjusting the first and second meters accordingly.

In some embodiment the method includes increasing the odds of winning for a first designated number of rounds in the persistent game mode, and decreasing the odds of winning for a second subsequent set of results. The persistent game mode rounds may include conducting a free spin with an animated display that ends with a free spin result, and for each free spin result, determining if the free spin result qualifies as part of a winning streak, and, if so, counting the size of the win streak and displaying progress on the first adjustable meter and the second rolling meter. In some embodiments, the persistent game round status indicators shown on the second rolling meter show the status of free spins and potential free spins. The second rolling meter may be operable to display at least one symbol that will be wild in a respective potential game event.

The method may include ending the persistent game mode upon a losing outcome in one of the rounds. In some versions, the second rolling meter is responsive to touchscreen inputs allowing the meter to be scrolled to see a history of the rolling subset of game events. The second rolling meter may be displayed as a line of symbol locations each representing an outcome of the subset of outcomes, with the symbol location updated to display a status of the outcome when the respective game In other versions, the invention may be embodied as a gaming system, including a display system, a player input system, at least one processor for operating the display system and player input system, and tangible memory connected to the processor and storing program code executable by the at least one processor to perform the required steps. Such program code is provided for controlling the display system to provide a gaming display, the gaming display including a first display area comprising a matrix of symbol locations. Code is also provided for receiving a player game activation through the player input system and, in response, providing an animated display in the first display area showing motion in the symbol locations which stops to provide a game outcome. The code is also executable to determine if the outcome includes a persistent feature activation, and, in response, beginning persistent game mode including multiple rounds in which each round includes a randomization of the matrix of symbol locations, a chance to win an award, and a chance to include a persistent feature event.

Program code is also provided for, in a second display area, displaying an adjustable meter of a persistent game feature, the meter showing a number of persistent feature events required to win first and second bonus awards, the meter adjusted based on a player wager level to reduce the number of events required to win the first and second bonus awards if the wager level is raised, and increase the number of persistent feature events required to win the first and second awards if the wager level is lowered, the meter displaying progress toward the first and second bonus awards. The code is also executable for, in a third display area, displaying a second rolling meter showing a rolling subset of persistent game round status indicators, and visually indicating on at least one status indicator a game feature scheduled to be present in at least one potential outcome, and providing a number of rounds of the persistent game mode and adjusting the first and second meters accordingly.

Program code may be provided to perform any of the method steps described herein. In some embodiments, the program code is further executable to, for a first designated number of rounds in the persistent game mode, increase the odds of winning, and for a second subsequent set of results, decreasing the odds of winning. The program code further may be executable for the persistent game mode to include a free spin with an animated display that ends with a free spin result, and for each free spin result, determine if the free spin result qualifies as part of a winning streak, and, if so, counting the size of the win streak and displaying progress on the first adjustable meter and the second rolling meter. The program code may be further executable to operate the persistent game round status indicators shown on the second rolling meter to show the status of free spins and potential free spins, or to display at least one symbol that will be wild in a respective potential game event.

The second rolling meter may be responsive to touchscreen inputs allowing the meter to be scrolled to see a history of the rolling subset of game events. The second rolling meter may also be displayed as a line of symbol locations each representing an outcome of the subset of outcomes, with the symbol location updated to display a status of the outcome when the respective game.

Another version of the invention is a computer program stored on a non-transitory readable medium. The software version is, of course, typically designed to be executed by a gaming machine or networked gaming system. The software includes multiple portions of computer executable code referred to as program code. Gaming results are provided in response to a wager and displayed by display program code that generates simulated slot reels each including one or more symbol locations. The program also has game controller program code for determining game play results involving spins or other randomization of an array of symbols, and providing the persistent game mode and its animations.

Another version of the invention is a gaming system that includes one or more gaming servers, and a group of electronic gaming machines connected to the servers by a network. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the game results to present the results received from the server in an entertaining manner. However, other embodiments of course might use a thin client architecture in which the animation is also conducted by the server and electronic gaming machines serve merely as a terminal to receive button or touchscreen input from the player and to display graphics received from the server.

Different features may be included in different versions of the invention. These and other advantages and features of the invention will be apparent from the following description of the preferred embodiments, considered along with the accompanying drawings.

DETAILED DESCRIPTION OF PREFERRED EMBODIMENTS

Figure 1A:
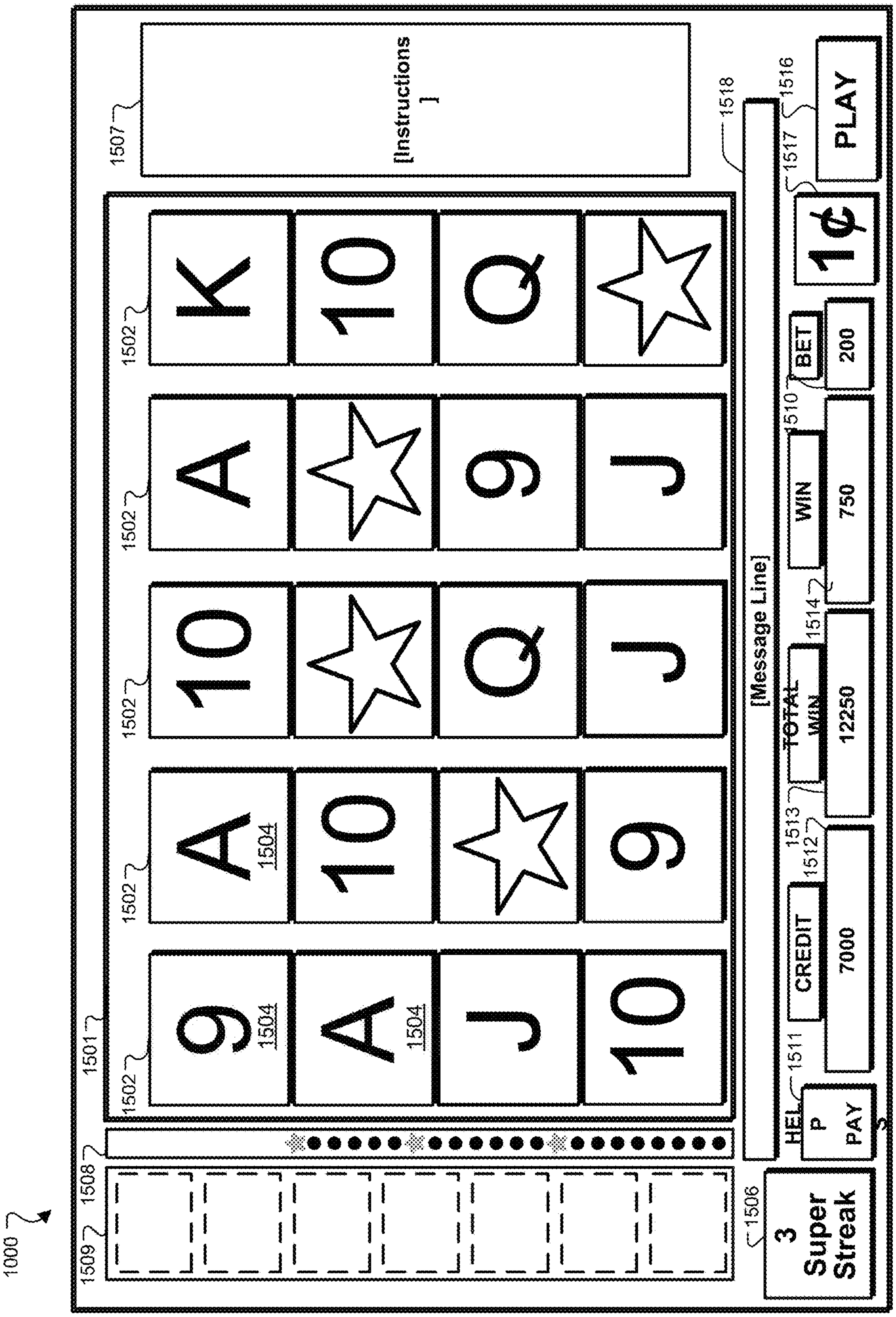
FIG. 1A is an example screen diagram of a game screen including an example reel game with a persistent game mode feature.
Figure 1B:
FIG. 1B is a screenshot view of a gaming device screen according to an example embodiment.

FIG. 1A is an example screen diagram of a game screen 1000 including an example reel game with a persistent game mode feature. FIG. 1B is a screenshot view of a gaming device screen according to an example embodiment. The depicted persistent game mode preferably occurs as a result of a designated trigger event in the base game such as a scatter pattern of bonus symbols. Regarding FIGS. 1A-1B, in this example embodiment, game screen 1000 has a first display area, which in this embodiment is a matrix of symbol locations 1501, in which is displayed the primary conduct of the base game and the persistent mode games described herein. The matrix of symbol locations 1501 consists of five simulated reels 1502, and each reel has four positions or symbol locations 1504. Of course this is not limiting and other embodiments may use differently sized arrays and may use uni-symbol reels instead of multi-symbols reels. FIG. 1A shows the instruction box or splash window 1507 which is shown temporarily at the beginning of a persistent game mode to give instructions or information to the player regarding the features of the persistent gaming mode. In this embodiment, the instruction box communicates that bonus prizes or jackpot prizes are available based on the player achieving a designated number of persistent feature events in the persistent mode, as will be further described below with respect to the embodiments below.

Toward the left of the diagram of FIG. 1A is the second display area 1508 which in this version displays a first adjustable meter for a persistent game feature, configured to communicate to the player the number of persistent feature events required to win each bonus award or jackpot award made available in the persistent game mode. In the preferred version shown, three jackpot prizes are available to be won, which is designated on the meter in 1508 by stars showing the number of persistent feature events necessary to win each jackpot. As shown, 9 events are needed to win the first jackpot, seven events more are needed to win the second jackpot, and six events more are needed win the third jackpot. Jackpots or other bonus awards may be available as shown on the meter. The meter and required events are adjustable based on a player wager level. For example, in the case with two bonus awards, the meter is adjusted to reduce the number of events required to win first and second bonus awards if the wager level is raised, and increase the number of persistent feature events required to win the first and second awards if the wager level is lowered. The meter displaying progress toward the bonus awards, as shown in FIG. 1B with the lighted bar showing progress toward the first award at the bottom of the first adjustable meter.

A third display area 1509 is shown in FIG. 1A including a second rolling meter which shows a sliding or rolling subset of persistent game round status indicators. For example, the rolling meter in area 1509 of FIG. 1B shows a rolling view of six game rounds, three completed rounds and three future rounds. That is, the rolling meter shows status indicators for a number of completed rounds and a number of scheduled rounds, which will be completed in the future if the persistent game mode continues long enough, as discussed with regard to the gaming flow charts below. The position of these six rounds relative to the overall progress toward the available prizes is also shown on the first adjustable meter in area 1508, which shows six of the meter dots highlighted, these six dots representing the six game rounds shown on the rolling meter. The rolling meter visually indicates on at least one status indicator a game feature scheduled to be present in at least one potential outcome. This can be seen in FIG. 2B, where the rolling meter has lighted status indicators in area 1509 showing completed persistent game mode rounds, and the unlighted indicators show future game rounds. The question mark shown in the unlighted indicator of FIG. 2B 1509 shows a special feature is scheduled to be present two game rounds in the future. Other types of indicators may be used to show a scheduled game feature, such as the gaming symbols displayed in two lighted indicators in 1509 showing symbols that were made wild in those two past rounds. As a game round is conducted, in this embodiment a spin of the reels, the current status indicator flashes and turns bright to show the round has been passed.

At the lower right corner of the matrix of symbol locations 1501 in FIGS. 1A-B is a persistent event meter 1506 showing the number of persistent feature events already achieved. The persistent feature event tracked may include one or more types of events defined in the game to be persistent, to persist after their presence in a round to affect a future result in some way. In a preferred version, a consecutive winning outcome is a persistent feature event, and the persistent feature event meter shows whether a winning streak is currently active and the size of the winning streak, that is how many winning free spin results in a row have been achieved in the current persistent game round. The function of the meters and persistent feature events will be further described with respect to the flowcharts below showing example versions.

Along the bottom of the diagram in FIGS. 1A and 1B are found various game information and interaction buttons such as the current wager display 1510, available credits display 1512, the current win display 1514. The currency denomination for the wagering credit is shown at box 1517, such as penny, nickel, dime, quarter, or dollar slots, for example. A Total Win display 1513 appears when a bonus round or other multiple round event (such as the persistent feature events described herein) occurs to track the total amount awarded among multiple rounds or sub-parts of a game. The display may also include a bet per line indicator in games where wagers are adjustable by bet per line. The touchscreen play button 1516 may be used instead of the manual button shown on the example gaming cabinet in FIG. 3A. The Help/Pays button 1511 accesses the help screen and paytable information for the game. Along the bottom of the matrix 1501, there is a message line 1518 for showing current messages to the player from the game or gaming network. Preferably a secondary display shows the available prizes, bonus prizes, or jackpots in each particular gaming mode.

Figure 2A:
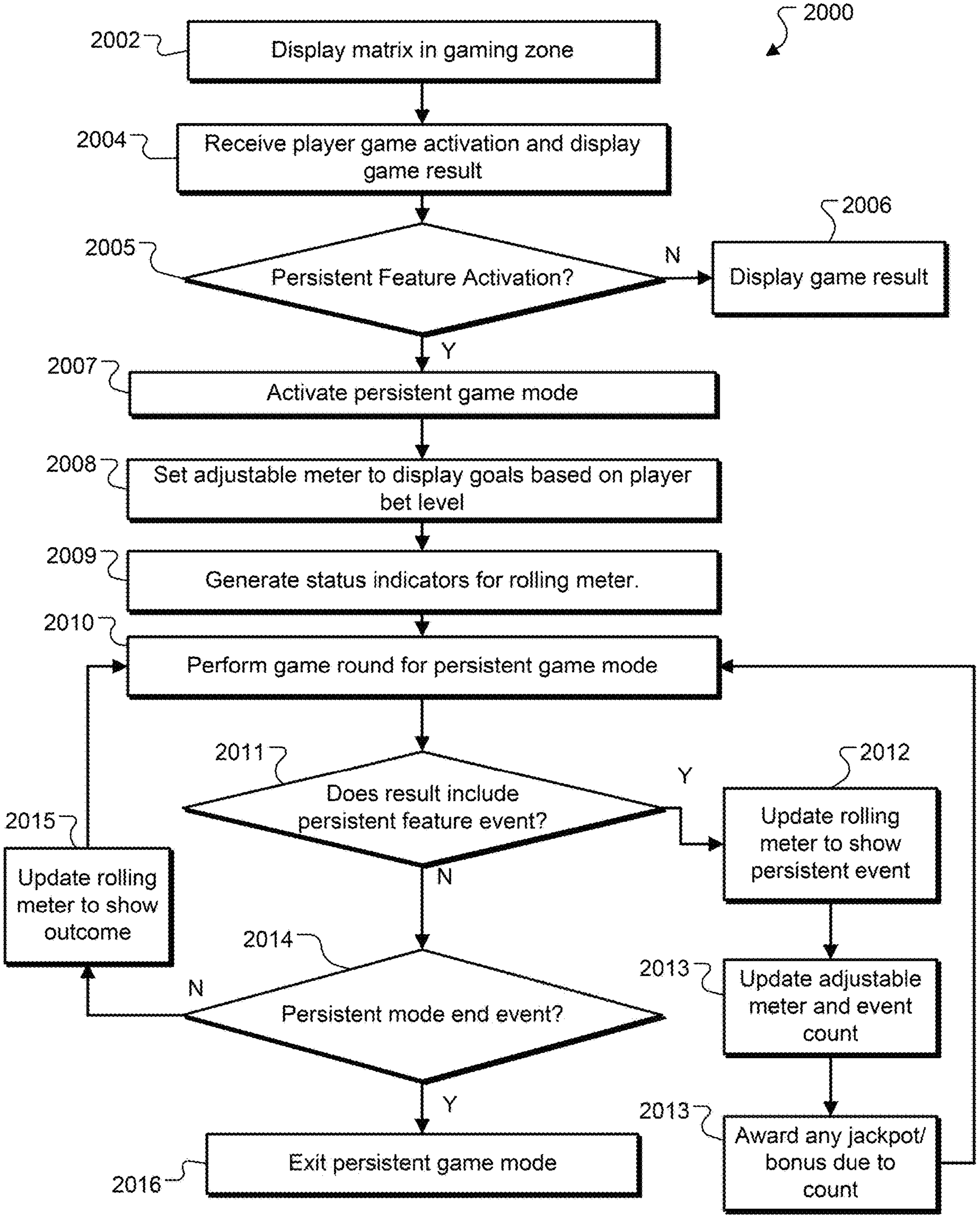
FIG. 2A is a flowchart showing a game play process according to one or more embodiments of the invention.
Figure 2B:
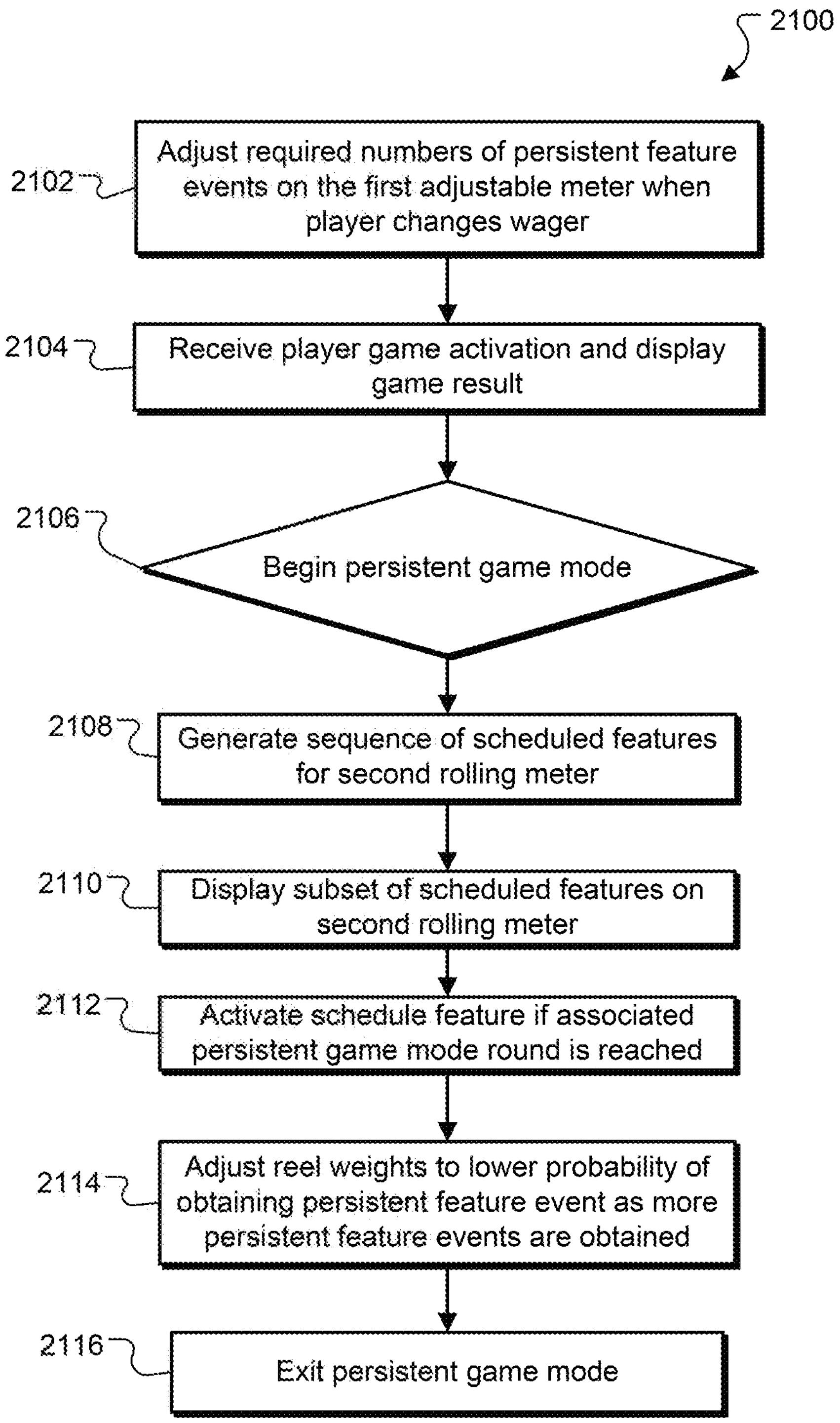
FIG. 2B is a flowchart of a control process for controlling the features of the persistent game mode according to some embodiments.

FIG. 2A is a flowchart showing a game play process 2000 according to one or more embodiments of the invention. This example process at block 2002 displays the gaming matrix in the first display area, with the process beginning with the game in base game mode and not yet displaying the persistent gaming mode features discussed above. Next, at block 2004, the process receives a player game activation and, in response, displays a game result, which may include other features and animations, but particularly may include a persistent gaming mode triggered by a designated pattern. In one embodiment, the persistent gaming mode trigger pattern is three or more bonus symbols scattered on any of the five reels. The process next at block 2005 determines if a persistent gaming mode trigger occurred and if not, the process displays the game result with any other features it contains at block 2006. If the persistent mode is found to be triggered at block 2005, the process goes to block 2008 where the persistent game mode rounds are conducted, including tracking the state of persistent feature events toward winning bonus prizes as further described below.

The persistent game mode preferably includes multiple free spins that are conducted in a sequence to complete the persistent game mode by repeating the depicted blocks. At block 2008, each persistent gaming mode round includes a free spin that is activated and a randomized game result animated and shown on the symbol locations such as those depicted in FIG. 1B. The repeated process at 2010 may continue until an end event occurs at block 2014. The end event may be a designated event in the game, or it may be the completion of a designated number or count of allocated free spins, which may or may not be shown to the player. A preferred version uses a win streak end as a persistent mode end event, providing that the first losing spin in a persistent game mode round ends the persistent game mode. After the free spin or other persistent game round at block 2010, the process at block 2011 checks the result to determine if a persistent feature event is present in the result. In the preferred version this check determines if the result is part of a winning streak ("win streak" or "hot streak"). This is preferably done simply by checking an integer variable which is incremented each time a free spin outcome wins an award, and reduced to zero each time a free spin outcome does not win an award. If the integer variable is one or greater and the current free spin result contains a win, then there are at least two wins in a row, constituting a winning streak. Other versions may use other game events for persistent feature events, including multiple types of persistent feature events. For example, the presence of a designated one or more symbols in the spin result may be a persistent feature event. A win of a designated type such as along a designated payline or using a designated symbol may be a persistent feature event. A random, mystery event not shown to the player may be a persistent feature event. The absence of a particular symbol may be a persistent feature event. Other suitable features in a game outcome may also be employed as a persistent feature event.

If the current result has a persistent feature event block 2011, the process goes to block 2012 where it updates the rolling meter 1509 to show the round completed with the persistent event result. Block 2012 may involve an animated display of some type for drawing the player's attention to the movement along the rolling meter. This block also includes rolling or sliding the rolling meter such that an old displayed game round status indicator moves off the rolling meter, and a new scheduled game round status indicator appears on the meter at the opposite end. This block moves the displayed status indicators appropriately to show features which are scheduled at designated outcomes along the rolling meter of status indicators. From block 2012, the process goes to block 2013 where, in this embodiment, the adjustable meter is updated to show more progress toward the player achieving the available bonus or jackpot prizes. If one of the bonus or jackpot prizes displayed on the meter is reached, the prize is awarded at block 2013.

Referring now to the other process option at block 2011, for spin outcomes that are not part of a winning streak, the process goes to block 2014 where it determines whether to continue the persistent game mode. If the game logic requires exit, the process exits the persistent game mode at block 2016, clearing any persistent feature event data accumulated for the current persistent game mode. If the persistent mode does not end, the process continues to block 2015 where it updates the rolling meter to show the persistent game mode round without a persistent feature event on its status indicator. Some versions of the game end the persistent game mode round when no persistent feature event is achieved, and so this block would not be used in those versions.

FIG. 2B is a flowchart of a control process for controlling the features of the persistent game mode according to some embodiments. The process may be employed with the embodiment of FIG. 2A and other embodiments as well. Process 2100 begins at block 2102 where the game controller responds to any changes in bet level (which can typically be made only between wagering rounds of the base game) by adjusting the required of persistent feature events on the first adjustable meter when player changes their wager. A higher wager requires fewer persistent feature events to win any particular one of the available bonus prizes or jackpots. A lower wager requires more persistent feature events to win any particular one of the available bonus prizes or jackpots. This adjustment process allows the game to provide bonus prizes or jackpots available to all wager levels to be won in the persistent game mode. Preferably, the adjustment is made to allow the same payout percentages over long term play of the game no matter what the bet level. This is preferably accomplished in combination with the both the scheduling of special features, such as wild symbols, in the persistent game mode rounds shown at block 2108, and in combination with adjusting the reel weights as the count of persistent feature events rises in order to provide a desired probability of winning the higher value bonus prizes or jackpots. Generally the process adjusts for a constant payout percentage based on all three depicted techniques: the required number of persistent feature events, the sequence and schedule of special features in persistent game mode rounds, and the adjustment of reel weights. Some embodiments may use only one or two of these techniques. While it is also possible in some versions of the invention to adjust the bonus prize or jackpot levels themselves, or enroll the player in different jackpot pools at different wager levels, this is not preferred because it is desired to give the player the explicit communication that they are playing for the same available jackpot pool no matter what their bet level. The required numbers of persistent feature events on the adjustable meter are calculated by computing the theoretical expected value contribution for each fixed prize and preserving the sum of all such values across all available bets. This is derived by taking the product of the probabilities to achieve every number of successful outcomes and the fixed jackpots. As an example consider the following scenario: the player bets $1 a jackpot is $10, a successful outcome is flipping a fair coin (therefore 50% likelihood), and the player is required to flip 4 heads in a row to win the jackpot. The probability of 4 successful outcomes is 0.54=0.0625 and therefore the theoretical expected value is (0.0625)*($10) =$0.625. Now if the player's bet was increased to $2, then we would need to find the correct number of successful outcomes that would preserve the theoretical expected value of $0.625. In this example that number would be 3.

After a persistent game mode begins at block 2106, the process at block 2108 generates a sequences of scheduled features to be included in designated game rounds, only if the persistent feature game mode continues long enough to reach each scheduled round as shown on the second rolling meter. The scheduling of special features may include designating certain symbols wild that are not ordinarily wild (the dog and cat symbols in 1509 of FIG. 1B, for example), adding special features such a prize multipliers, wager multipliers, or individual bonus awards (which may all be present at the scheduled question mark feature in 1509 of FIG. 1B), and adding other features such as a mystery adjustment in which a round that does not include a persistent feature event in the reel spin is changed in an animated sequence to include such an event. The schedule of special features is added to the second rolling meter (1509) at block 2110, with a rolling subset of the features displayed at any given time. The schedule of special features is designed to provide what appears most enjoyable to the player, by providing a displayed schedule of future features tending to create player excitement. Different predetermined schedules may be produced in advance by the game designers, or the schedule may be produced as the game is played based on an assigned probability of particular events appearing in particular locations on the meter. A random number may be generated for each meter location, and used to lookup in a table a feature (or no feature) to fill that location. The frequency of features in the table may be changed as the meter locations proceed, and certain features may be added or removed from the table as the meter location number (first, second, third) increases in order to distribute them in the desired manner in the meter, and thereby in the bonus round. The schedule may be adjusted by rules if successful outcomes from the random generation process are too many or too few. As an example, 1509 illustrates a case where certain symbols change to wild symbols after 2, 4 and 6 consecutive winning spins. Obviously, as more symbols turn to wild symbols the probability of a winning spin increases. So if the designer believed that the top jackpot was too high and appeared unachievable, then adjusting the characters on the meter upward, by a rule or by a predetermined design, would have the reverse effect on the top jackpot. At block 2112, the process activates the scheduled features if and when the persistent game mode reaches the round with a scheduled feature. Finally, the persistent game mode control process at block 2114 also adjusts the reel weights as the persistent game mode goes on in order to lower probability of obtaining persistent feature event as more persistent feature events are obtained. This adjustment is done by a secondary calculation which derives the probability of a successful outcome for each reel weight configuration to ensure the product of said probabilities results in the exact return to player calculation. Generally, block 2114 is an ongoing control process throughout the persistent game mode. After the game mode exits by one of the scenarios described above, the control process exits the persistent game mode at block 2116 and returns to the base game play.

Figure 3A:
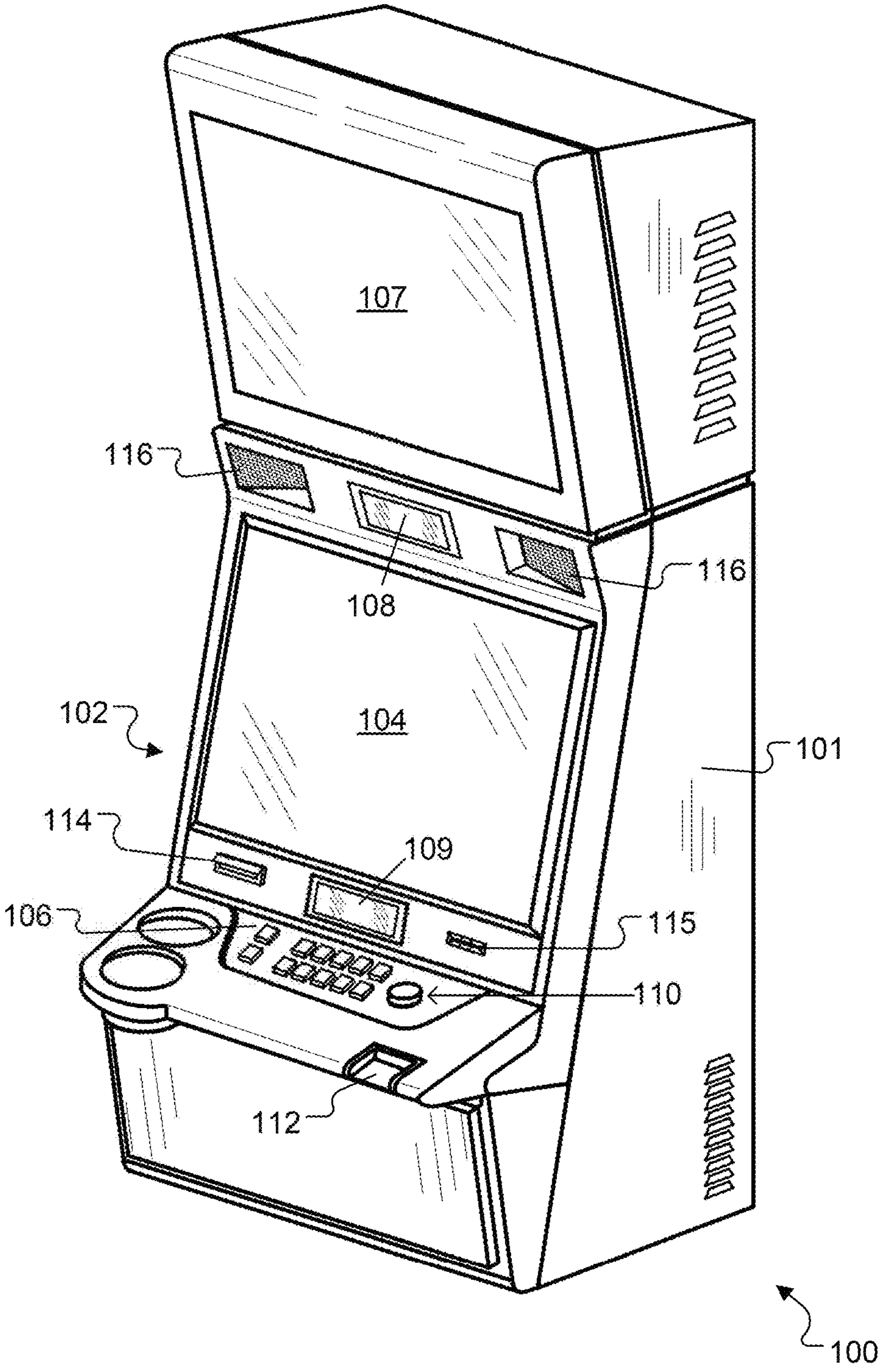
FIG. 3A is a front perspective view of a gaming machine which may be used in a gaming system embodying the principles of the present invention.
Figure 3B:
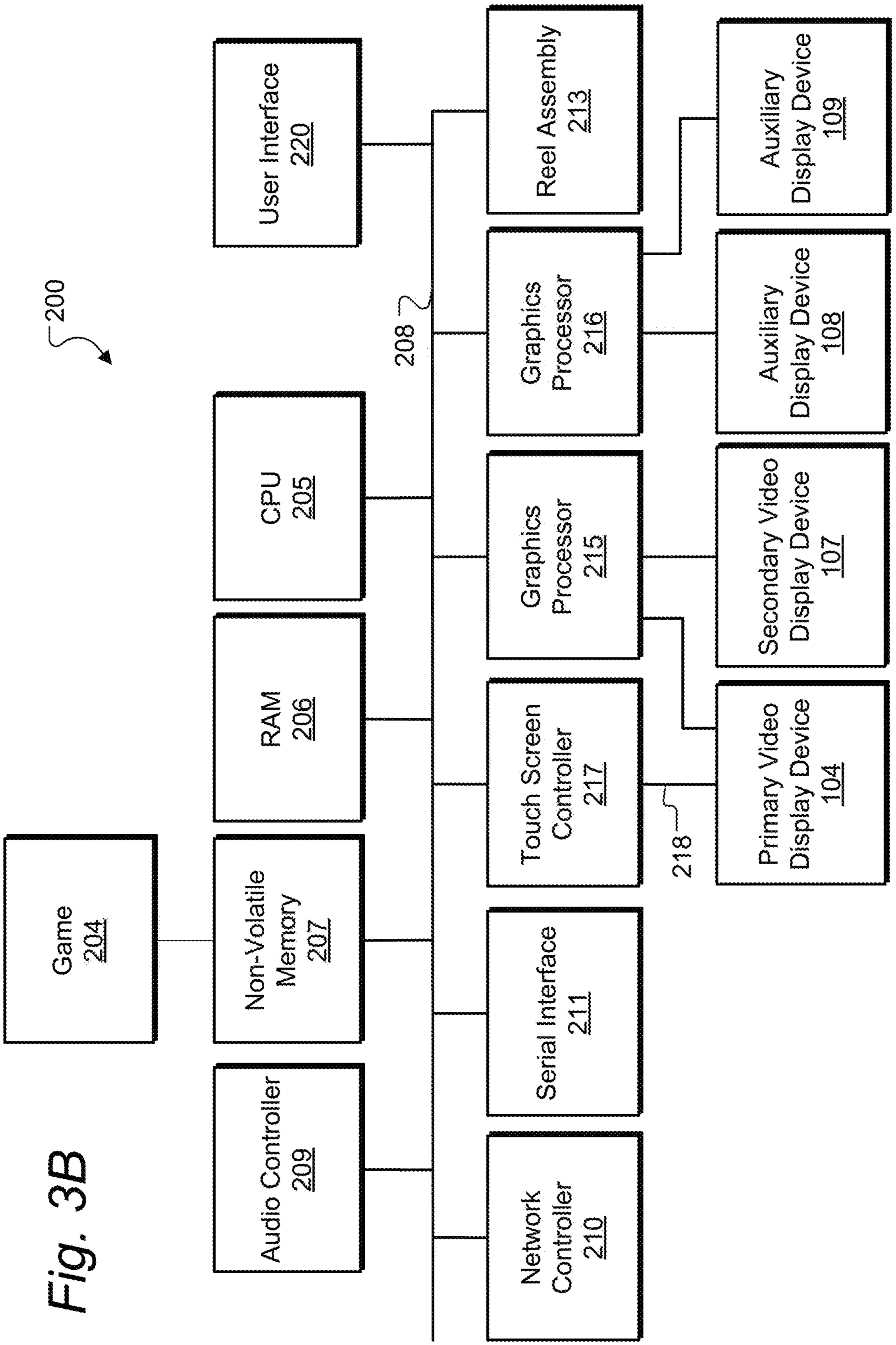
FIG. 3B is a block diagram showing various electronic components of the gaming machine shown in FIG. 3A together with additional gaming system components.

FIG. 3A shows a gaming machine 100 that may be used to implement a persistent feature game according to the present invention. The block diagram of FIG. 3B shows further details of gaming machine 100. Referring to FIG. 3A, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 3A also includes a number of mechanical control buttons 110 mounted on ledge 106. These control buttons 110 may allow a player to select a bet level, select paylines, select a type of game or game feature, and actually start a play in a primary game. Further, primary video display device 104 in gaming machine 100 provides a convenient display device for implementing touchscreen controls.

It will be appreciated that gaming machines may also include a number of other player interface devices in addition to devices that are considered player controls for use in playing a particular game. The ledge may also include a hardware special object including a button, touch sensor, or switches, joysticks, or other mechanical input devices, and/or virtual buttons and other controls implemented on a suitable touchscreen video display. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 3B shows a logical and hardware block diagram 200 of gaming machine 100 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on bus 208 and is connected to drive primary video display device 104 and secondary video display device 107 (both mounted on cabinet 101 as shown in FIG. 3A). A second graphics processor 216 is also connected on bus 208 in this example to drive the auxiliary display devices 108 and 109 also shown in FIG. 3A. As shown in FIG. 3B, gaming machine 100 also includes a touch screen controller 217 connected to system bus 208. Touch screen controller 217 is also connected via signal path 218 to receive signals from a touchscreen element associated with primary video display device 104. It will be appreciated that the touchscreen element itself typically comprises a thin film that is secured over the display surface of primary video display device 104. The touchscreen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 3B are elements commonly associated with a personal computer system architecture. These elements are preferably mounted on a standard personal computer chassis and housed in a standard personal computer housing which is itself mounted in cabinet 101 shown in FIG. 3A. Alternatively, the various electronic components may be mounted on one or more circuit boards housed within cabinet 101 without a separate enclosure such as those found in personal computers. Those familiar with data processing systems and the various data processing elements shown in FIG. 3B will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 3B as being connected directly on system bus 208 may in fact communicate with the other system components through a suitable expansion bus. Audio controller 209, for example, may be connected to the system via a PCI bus. System bus 208 is shown in FIG. 3B merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. In some embodiments, the persistent event meter 1506 may be displayed on secondary video display 107 rather than beside the matrix of symbol locations or other type of primary gaming zone on the primary display. The invention is not limited to any particular arrangement of processing devices for controlling the video display device included with gaming machine 100. Also, a gaming machine implementing the present invention is not limited to any particular number of video display devices or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine, and may also implement a game client for directing one or more display devices at the gaming machine to display the persistent game mode features according to the present invention. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs, while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included. In particular, network controller 210 provides an interface to a game controller which controls certain aspects of the persistent game mode as will be discussed below in connection with FIG. 4A.

It should be noted that the invention is not limited to gaming machines employing the personal computer-type arrangement of processing devices and interfaces shown in example gaming machine 100. Other gaming machines through which a persistent game mode feature game is implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is possible to implement a persistent game mode feature game within the scope of the present invention using an electro mechanical arrangement or even a purely mechanical arrangement for displaying the symbols or first and second animations or reactions needed to complete the persistent game mode as described herein. For example, a gaming machine suitable for providing a persistent game mode feature game may include a mechanical reel-type display rather than a video-type display device for displaying results in a primary game, and include a video display device for presenting the persistent event meter 1506 separately.

Still referring to the hardware and logical block diagram 200 showing an example design for a gaming machine 100, the depicted machine in operation is controlled generally by CPU 205 which stores operating programs and data in memory 207 with wagering game 204, user interface 220, network controller 210, audio/visual controllers, and reel assembly 213 (if mechanical reel configuration). CPU or game processor 205 may comprise a conventional microprocessor, such as an Intel Pentium microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information, and game processor 205 may respond according to its programming, such as to apply a wager and initiate execution of a game.

Figure 4A:
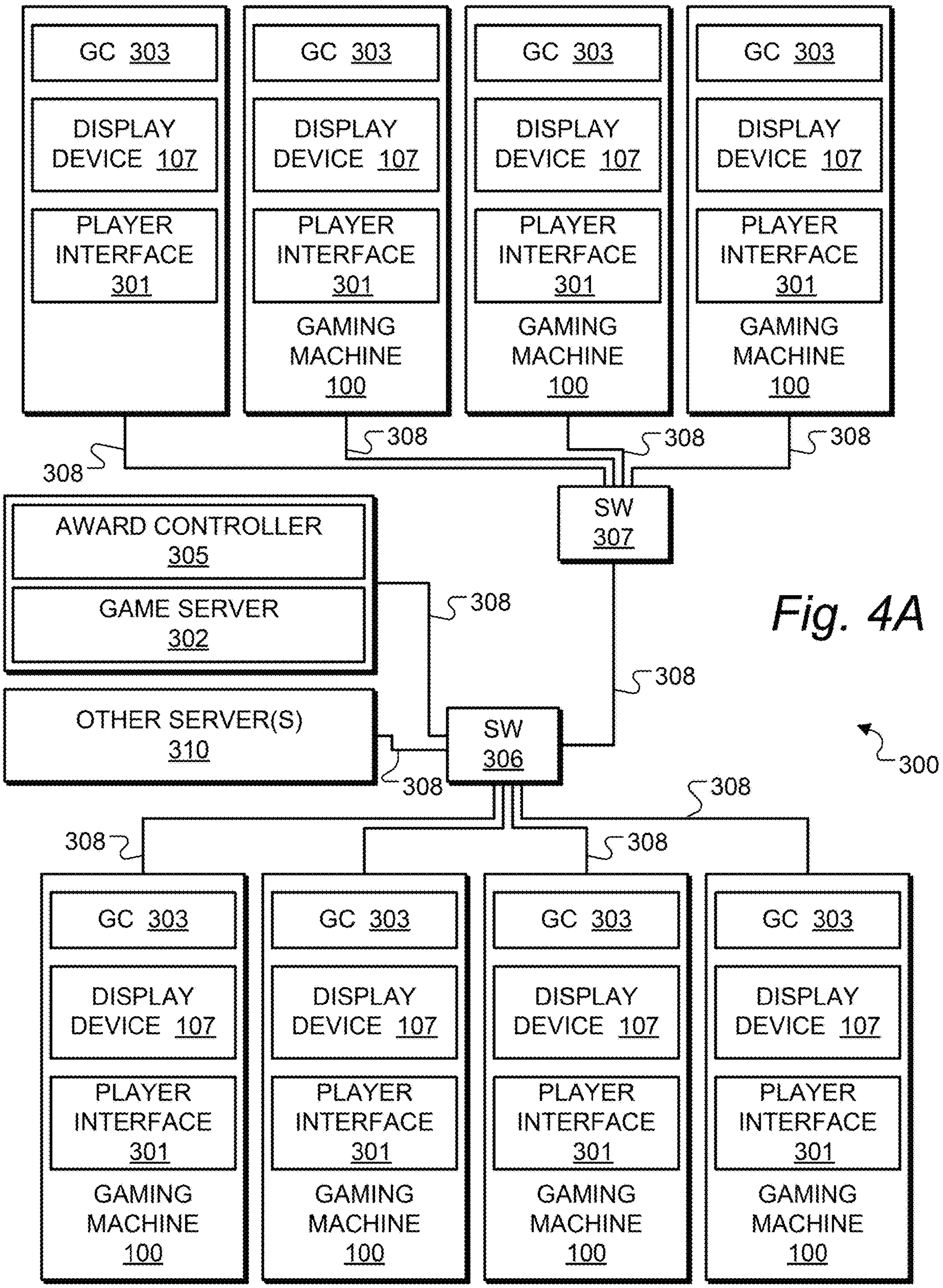
FIG. 4A is a system block diagram of a gaming system according to one embodiment of the present invention.
Figure 4B:
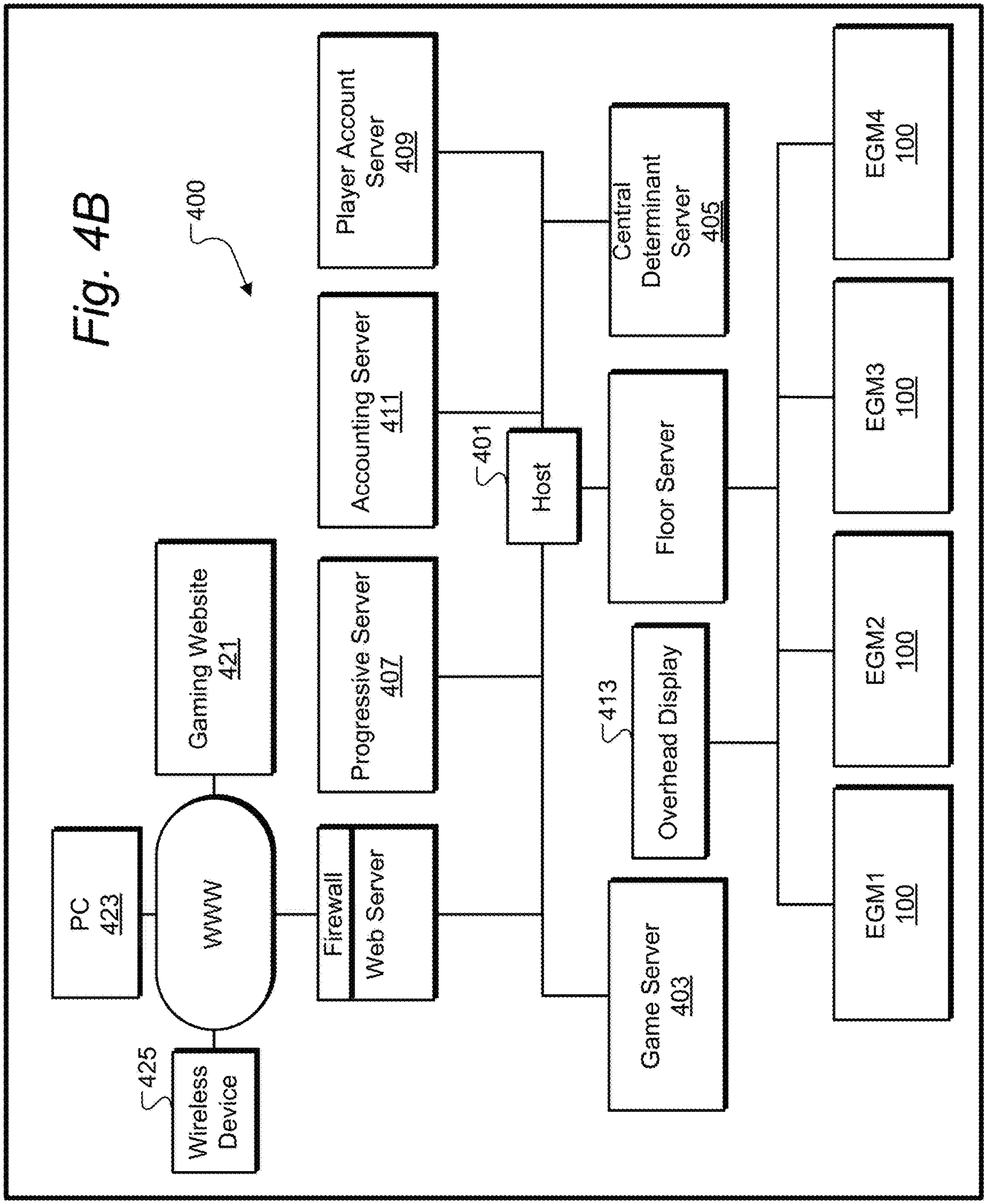
FIG. 4B is a system block diagram of a gaming system according to another embodiment of the invention.

Game processor 205 also may connect through network controller 210 to a gaming network, such as example casino server network 400 shown in FIG. 4B. Referring now to FIG. 4B, the casino server network 400 may be implemented over one or more site locations and include host server 401, remote game play server 403 (which may be configured to provide game processor functionality including determining game outcomes and providing audio/visual instructions to a remote gaming device), central determinant server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

Referring now to FIG. 4A, a gaming system 300 according to another embodiment of the present invention is shown again in a network and system diagram format. System 300 includes a number of gaming machines, each comprising a gaming machine 100 in this example implementation. For purposes of describing system 300, each gaming machine 100 in FIG. 4A is shown as including a video display device 107 and a player interface 301 that may include buttons, switches, or other physical controls and/or touchscreen controls as discussed above in connection with FIG. 4A.

System 300 further includes a game server 302 and a respective game client 303 (abbreviated "GC" in FIG. 4A) included with each respective gaming machine 100. In the form of the invention shown in FIG. 4A, these two components, game server 302 and the game client components 303, combine to implement a game control arrangement which will be described in detail below. System 300 also includes an award controller 305, which is shown in FIG. 4A as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 4A.

Each gaming machine 100, and particularly player interface 301 associated with each gaming machine, allows a player to make any inputs that may be required to make the respective gaming machine eligible for a persistent game mode, and make other inputs that may be required to conduct the game. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of a persistent game mode at the respective gaming machine.

The game control arrangement made up of game server 302 and the respective game client 303 at a given gaming machine functions to control the respective video display device 107 for that gaming machine to display the base and bonus games herein. Award controller 305 is responsible for awarding prizes for a player's participation in a persistent game mode, and maintaining progressive prize information where the persistent game mode offers one or more progressive prizes. The network arrangement made up of network switches 306 and 307, and the various communication links 308 shown in FIG. 4A is illustrated merely as an example of a suitable communications arrangement. It should be noted that the game control arrangement, or as it is referred to generally the "game controller," may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 4A shows other server(s) 310 included in the network. This illustrated "other server(s)" element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, an additional one of the other servers 310 will be included in apparatus 300 for supporting these types of wagering and payout systems. As another example, the various gaming machines 100 included in system 300 may allow players to participate in a game (primary game) different from the game described herein, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 4A are shown only to indicate that numerous other components may be included along with the elements that participate in providing persistent game modes according to the present invention. Other server(s) 310 may provide record keeping, player tracking, accounting, result identifying services, or any other services that may be useful or necessary in a gaming system.

Referring to FIG. 4B, a block diagram of another example networked gaming system 400 associated with one or more gaming facilities is shown, including one or more networked gaming machines 100 in accordance with one or more embodiments. With reference to FIG. 4B, while a few servers have been shown separately, they may be combined or split into additional servers having additional capabilities.

As shown, networked gaming machines 100 (EGM1-EGM4) and one or more overhead displays 413 may be network connected and enable the content of one or more displays of gaming machines 100 to be mirrored or replayed on an overhead display. For example, the primary display content may be stored by the display controller or game processor 205 and transmitted through network controller 210 to the overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective player's video images may be displayed on overhead display 413 along with the content of the player's gaming machine 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Apple iPhone, Android phone, tablet, phablet, virtual reality device, iPad, etc.). To enter the website, a player may log in with a username (that may be associated with the player's account information stored on player account server 409 or be accessible by a casino operator to obtain player data and provide promotional offers), play various games on the website, make various personalizing selections and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for providing a wagering game, the method including:

controlling a gaming display with one or more electronic processors, the gaming display including a first display area comprising a matrix of symbol locations;

entering a persistent game mode including multiple rounds in which each round includes a randomization of the matrix of symbol locations and a possibility of winning;

while in the persistent game mode, in a second display area of the gaming display, displaying a first meter showing progress toward a bonus award achieved by accumulating persistent feature events in the multiple rounds;

while in the persistent game mode, in a third display area of the gaming display, displaying a second rolling meter showing a rolling subset of persistent game round status indicators, the rolling subset showing a game feature status for a number of future game rounds equal to the number of status indicators in the rolling subset, with each status indicator associated with a single specified one of future game rounds, and visually indicating on at least one of the subset of persistent game round status indicators a game feature scheduled to be activated in a respective specific future game round outcome indicated by a position of the respective status indicator in the second rolling meter; and providing a number of game rounds of the persistent game mode and adjusting the first meter and second rolling meter based on results of the game rounds.

2. The method of claim 1 further comprising adjusting the first meter to reduce or increase a number of persistent feature events required to win the bonus award.

3. The method of claim 2, wherein the first meter is adjusted based on a player wager amount.

4. The method of claim 1, further comprising for a first designated number of rounds in the persistent game mode, increasing the odds of winning, and for a second subsequent set of results, decreasing the odds of winning.

5. The method of claim 4, wherein the second rolling meter is operable to display at least one symbol that will be wild in a respective potential game event.

6. The method of claim 1, wherein the persistent game mode rounds include conducting a free spin with an animated display that ends with a free spin result, and for each free spin result, determining if the free spin result qualifies as part of a winning streak, and, if so, counting the size of the winning streak and displaying progress on the first meter and the second rolling meter.

7. The method of claim 1, wherein the persistent game round status indicators shown on the second rolling meter to show status of free spins and potential free spins.

8. The method of claim 1, further comprising:

generating a sequence of scheduled features to be shown in the persistent game round status indicators of the second rolling meter; and displaying the sequence in the persistent game round status indicators in the order in which the features are scheduled to appear in respective future game rounds.

9. The method of claim 1, wherein the second rolling meter is displayed as a line of symbol locations each representing an outcome of a subset of outcomes, with the symbol location updated to display a status of the respective outcome when a respective potential game round outcome represented by the respective game round status indicator is completed.

10. A gaming system including:

(a) a display system;

(b) a player input system;

(c) at least one processor operably coupled to the display system and player input system; and (d) at least one memory device operably coupled to the processor and storing program code executable by the at least one processor for:

controlling the display system to provide a gaming display, the gaming display including a first display area comprising a matrix of symbol locations;

controlling a gaming display with one or more electronic processors, the gaming display including a first display area comprising a matrix of symbol locations;

entering a persistent game mode including multiple rounds in which each round includes a randomization of the matrix of symbol locations;

while in the persistent game mode, in a second display area, displaying a first meter showing progress toward a bonus award achieved by accumulating persistent feature events in the multiple rounds;

while in the persistent game mode, in a third display area, displaying a second rolling meter showing a rolling subset of persistent game round status indicators indicating a game feature status for a number of future game rounds equal to the number of status indicators in the rolling subset, with each status indicator associated with a single specified one of future game rounds, and visually indicating on at least one of the status indicators a game feature scheduled to be activated in a respective specific future game round outcome indicated by a position of the respective status indicator in the second rolling meter; and providing a number of game rounds of the persistent game mode and adjusting the first meter and second rolling meter based on results of the game rounds.

11. The system of claim 10, in which the first meter is adjustable to reduce or increase a number of persistent feature events required to win the bonus award.

12. The system of claim 11, in which the first meter is adjusted based on a player wager amount.

13. The system of claim 10, in which the program code is further executable to, for a first designated number of rounds in the persistent game mode, increase the odds of winning, and for a second subsequent set of results, decreasing the odds of winning.

14. The system of claim 10, wherein the program code is further executable for directing the persistent game mode to include a free spin with an animated display that ends with a free spin result, and for each free spin result, determine if the free spin result qualifies as part of a winning streak, and, if so, counting the size of the winning streak and displaying progress on the first meter and the second rolling meter.

15. The system of claim 10, wherein the program code is further executable for the persistent game round status indicators shown on the second rolling meter to show status of free spins and potential free spins.

16. The system of claim 10, wherein the program code is further executable to cause the second rolling meter to display at least one symbol that will be wild in a respective potential game event.

17. The system of claim 10, wherein the program code is further executable for ending the persistent game mode upon a losing outcome in one of the rounds.

18. The system of claim 10, wherein the program code is further executable for causing the second rolling meter to be displayed as a line of symbol locations each representing a game round status indicator for an outcome of a subset of outcomes, with the symbol location updated to display a status of the outcome when a respective potential game round outcome represented by the respective game round status indicator is completed.

19. The system of claim 10, wherein the program code is further executable or:

generating a sequence of scheduled features to be shown in the persistent game round status indicators of the second rolling meter; and displaying the sequence in the persistent game round status indicators in the order in which the features are scheduled to appear in respective future game rounds.

* * * * *